United States Patent [19]

Kashio

[11] 4,189,774
[45] Feb. 19, 1980

[54] CHANGE CALCULATING APPARATUS
[75] Inventor: Toshio Kashio, Tokyo, Japan
[73] Assignee: Casio Computer Co., Ltd., Tokyo, Japan
[21] Appl. No.: 910,350
[22] Filed: May 30, 1978
[30] Foreign Application Priority Data
  Jun. 3, 1977 [JP] Japan ............................. 52-65569
[51] Int. Cl.² .................. G06F 15/20; G07G 1/00
[52] U.S. Cl. ................................................ 364/405
[58] Field of Search ................... 364/405; 235/7 A
[56] References Cited
  U.S. PATENT DOCUMENTS
  3,045,901 7/1962 Allen ............................. 235/7 A

| 3,049,288 | 8/1962 | Becker et al. | 235/7 A |
| 3,330,947 | 7/1967 | Alpert et al. | 364/405 |
| 3,691,360 | 9/1972 | Gross et al. | 364/405 |

Primary Examiner—David H. Malzahn
Attorney, Agent, or Firm—Frishauf, Holtz, Goodman & Woodward

[57] ABSTRACT

A change calculation apparatus comprises a plurality of keys for indicating monetary units, purchasing amount storing means for storing the purchasing amount of sales to a customer, and calculating means for subtracting from the unitary data of the monetary unit corresponding to the key actuated the data below the unitary data of the monetary unit in the purchasing amount stored in the purchasing amount storing means.

3 Claims, 6 Drawing Figures

| $100.01 DOLLAR FOR PURCHASING AMOUNT | | |
|---|---|---|
| AMOUNT OF RECEIVED MONEY (DOLLAR) | CHANGE CALCULATION | CHANGE (DOLLAR) |
| 200 | (100) − 00.01 | 99.99 |
| 150 | (50) − 00.01 | 49.99 |
| 120 | (20) − 00.01 | 19.99 |
| 110 | (10) − 00.01 | 9.99 |
| 105 | (5) − 0.01 | 4.99 |
| 102 | (2) − 0.01 | 1.99 |
| 101 | (1) − 0.01 | 0.99 |
| 100.50 | (0.5) − 0.01 | 0.49 |
| 100.25 | (0.25) − 0.01 | 0.24 |
| 100.10 | (0.10) − 0.01 | 0.09 |
| 100.05 | (0.05) − 0.01 | 0.04 |

| AMOUNT OF RECEIVED MONEY (YEN) | CHANGE CALCULATION | CHANGE (YEN) |
|---|---|---|
| ¥13234 YEN FOR PURCHASING AMOUNT | | |
| 20000 | (10000) — 3234 | 6766 |
| 15000 | (5000) — 3234 | 1766 |
| 14000 | (1000) — 234 | 766 |
| 13500 | (500) — 234 | 266 |
| 13300 | (100) — 34 | 66 |
| 13250 | (50) — 34 | 16 |
| 13240 | (10) — 4 | 6 |
| 13235 | (5) — 4 | 1 |

FIG. 5

| $100.01 DOLLAR FOR PURCHASING AMOUNT | | |
|---|---|---|
| AMOUNT OF RECEIVED MONEY (DOLLAR) | CHANGE CALCULATION | CHANGE (DOLLAR) |
| 200 | (100) − 00.01 | 99.99 |
| 150 | (50) − 00.01 | 49.99 |
| 120 | (20) − 00.01 | 19.99 |
| 110 | (10) − 00.01 | 9.99 |
| 105 | (5) − 0.01 | 4.99 |
| 102 | (2) − 0.01 | 1.99 |
| 101 | (1) − 0.01 | 0.99 |
| 100.50 | (0.5) − 0.01 | 0.49 |
| 100.25 | (0.25) − 0.01 | 0.24 |
| 100.10 | (0.10) − 0.01 | 0.09 |
| 100.05 | (0.05) − 0.01 | 0.04 |

CHANGE CALCULATING APPARATUS

BACKGROUND OF THE INVENTION

The invention relates to a change calculating apparatus for calculating change by subtracting the amount of sales to a customer from the data of the money received from the customer, which is adaptable for an electronic cash register, for example.

In a conventional cash register, an operator, after inputting the purchasing amount of the customer, inputs the amount of money received from the customer to automatically obtain the change. By convention, the operator operates the keys to input all of the numerals representing the amount of the received money into the cash register. For example, when the data of the money received from the customer is 145.32 dollars, the operator successively pushes keys in the order of 1, 4, 5, 3, 2. However, such a key operation is troublesome for the operator, frequently leading to erroneous keying of the received money.

Accordingly, an object of the invention is to provide a change calculating apparatus in which the keying operation of the received money by an operator is performed in a simple manner and a correct calculation of change is ensured.

SUMMARY OF THE INVENTION

According to the invention, there is provided a change calculation apparatus comprising: means for storing the purchasing amount of sales to a customer; a plurality of keys for indicating the monetary units; and calculating means for subtracting from the unitary data of the monetary unit corresponding to the key actuated the data below the unitary data of the monetary unit of the purchasing amount stored in said sales storing means.

With such a construction, when calculating change, the operator does not need push the keys for the entire amount of the received money, but merely actuates one time the key corresponding to the unitary data of the corresponding to the monetary unit in the received money. Accordingly, the key operation in the change calculation is remarkably simplified and thus erronous keying which otherwise possibly occurs, is eliminated.

BRIEF DESCRIPTION OF THE DRAWINGS

FIG. 5 shows tabularly illustrates the principle of the invention by using the monetary system of the U.S.A.

DETAILED DESCRIPTION

Figure 1:
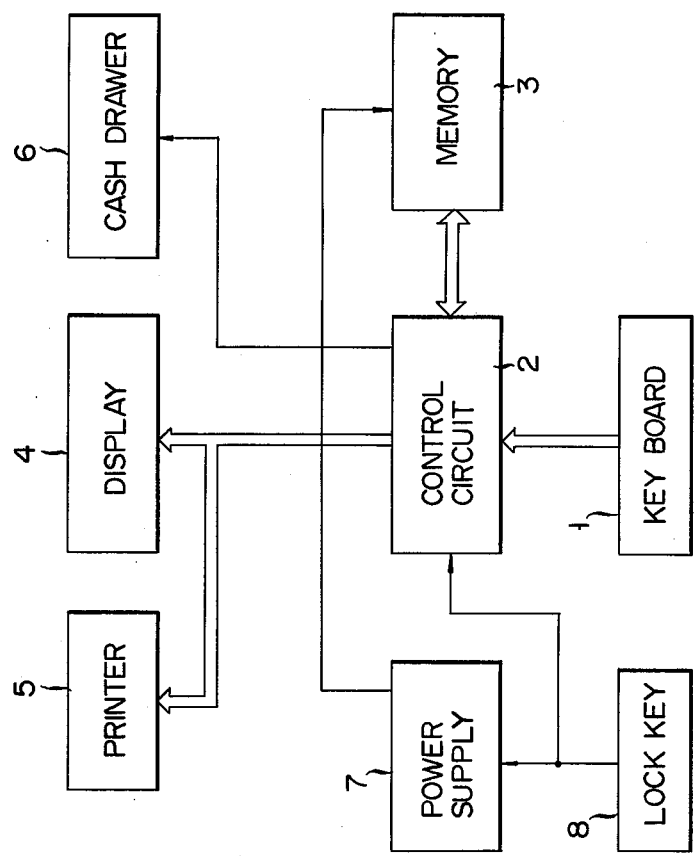
FIG. 1 shows a block diagram of a basic construction of an electronic cash register to which the invention is applied.
Figures 2, 4:
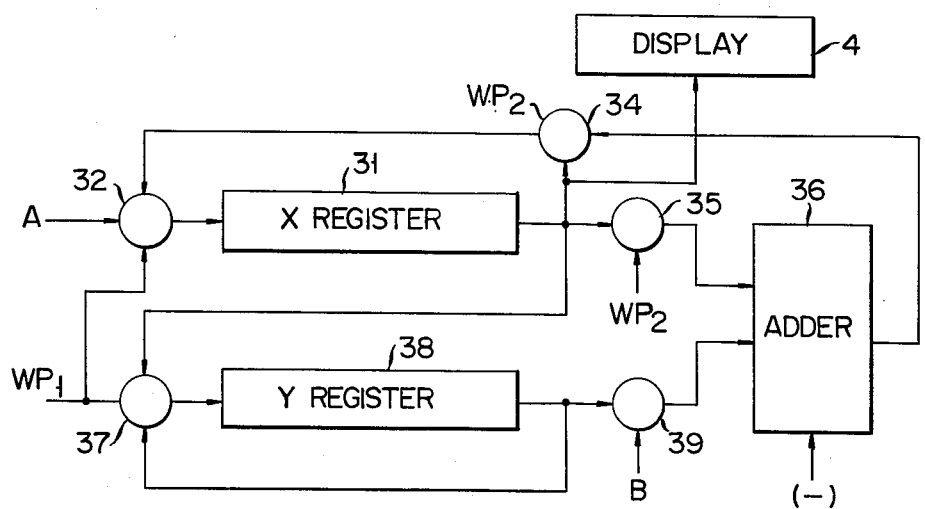
FIG. 2 tabularly illustrates the principle of the invention by using the Japanese monetary system.
FIG. 4 shows a block diagram of a change calculation control unit.

Referring now to FIG. 1, there is shown a basic construction of an electronic cash register embodying the invention. In the figure, reference numeral 1 designates a keyboard provided with various keys; department keys for designating the respective departments of items sold, ten keys, function keys, an amount key, a clerk key, a % key, a transaction key, a clear key, keys for indicating monetary units. The data entered the apparatus by a key operation on the keyboard 1 is transferred to a control circuit 2. The control circuit 2 is coupled with a memory 3 for storing the data of takings of sold items, preset data and like. The data entered from the keyboard is arithmetically processed in the control circuit 2 and the result of the arithmetic operation is stored into the memory 3. The input data from the keyboard 1 and the result of the arithmetic operation are transferred through the control circuit 2 to a display section 4 and a printer 5. A cash drawer 6 is controlled by the control signal from the control circuit 2. The cash drawer 6 is used for storing takings. A power supply 7 supplies electric power to the respective portions of the register. Operation and non-operation of the power supply 7 and the control circuit 2 are controlled by a lock key 8. When none of keys is actuated, the power source 7 and the control circuit 2 are key-locked and in an inoperative condition. When a given lock key is actuated, the locking state of them is released so that the power supply 7 supplies power to the respective portions and the control circuit 2 is in an operable state to initiate its operation responsive to the input data from the keyboard 1. Incidentally, power supply to the memory 3 continues even in the key-locking condition. In the invention, change is calculated in the following manner. The key is actuated which corresponds to the unitary data of the monetary unit of the money received from a customer. Then, the data of the monetary unit less than the monetary unit corresponding to the key actuated is subtracted from the unitary data of the monetary unit. This will be more detailed relating to some cases in accordance with the monetary system in Japan, as shown in FIG. 2. The first case is that the total amount of sales to a customer is ¥13,234 and the money received from a customer is ¥20,000. In this case, the unit key for indicating ¥10,000 is depressed so that the cash register performs the change calculation "10,000−3234=6766". The second case is that the received money is ¥15,000. In this case, the unit key of ¥5,000 is depressed so that it calculates "10,000−3224=1766". Similarly, the key of ¥1,000 is pushed for the received money ¥14,000; the ¥500 unit key, for ¥13,500; the ¥100 unit key, for ¥13,300; the ¥50 unit key, for 13,240; the ¥10 unit, key for ¥13,240; the ¥5 unit key, for ¥13,235. In this manner, the change calculation is made as shown in FIG. 2.

Figure 3:
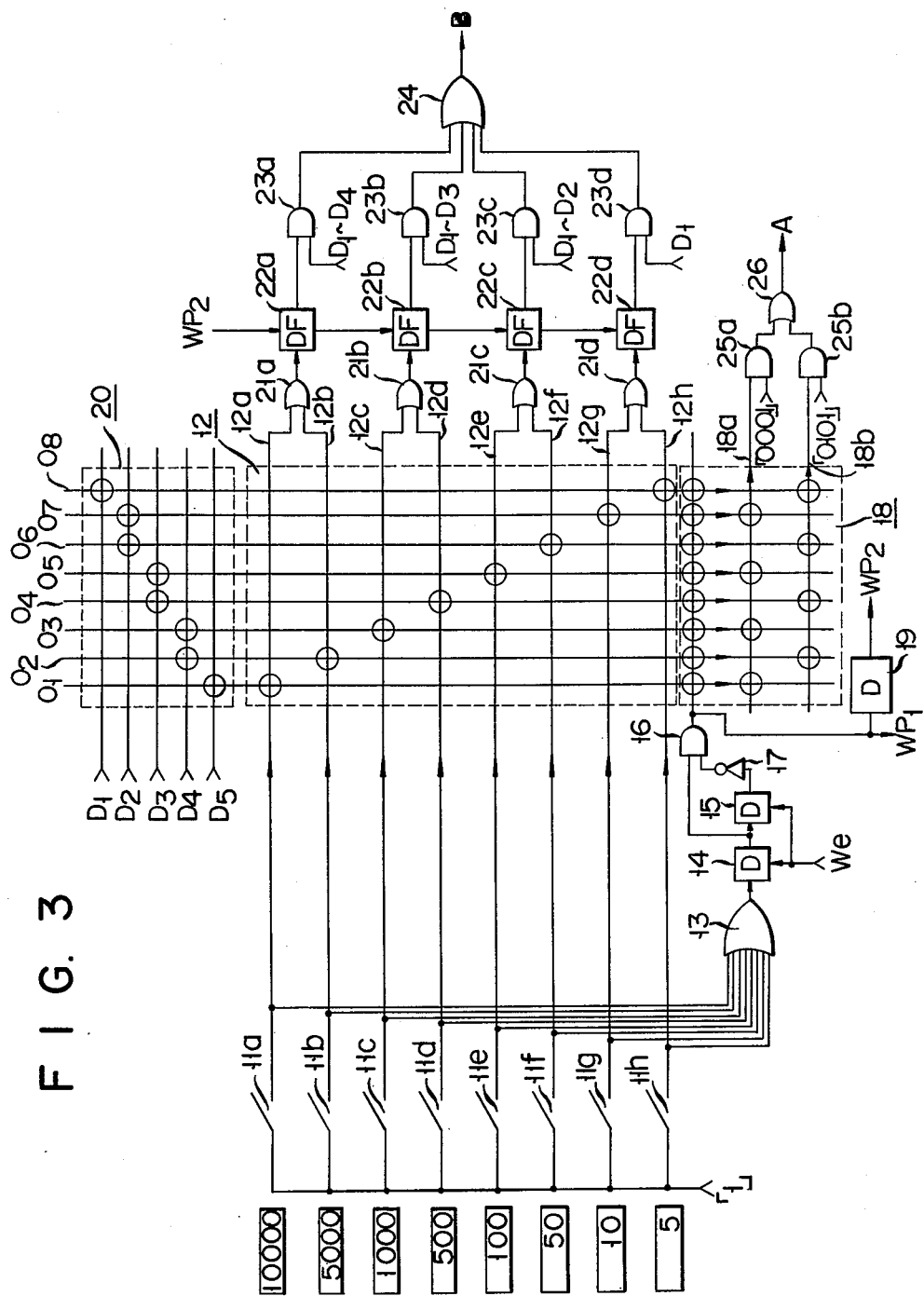
FIG. 3 shows a circuit diagram of an input control unit for the change calculation in FIG. 1.

The explanation to follow is the construction of a change control section in the control circuit 2, to perform the above-mentioned change calculation. In FIG. 3, monetary unit indication keys designated by reference numerals 11a to 11h correspond to monetary units in Japan, "¥10,000", "¥5,000", "¥1,000", "¥500", "¥100", "¥50", "¥10" and "¥5". Key operation signals produced by operating, i.e. pushing, the keys 11a to 11h are inputted to a decoder 12 and to a delayed flip-flop 14 via an OR circuit 13. The output signal of the delayed flip-flop 14 is applied to another delayed flip-flop 15. The flip-flops 14 and 15 set input data therein in synchronism with a timing signal We outputted at the final timing of one word time. The output of the flip-flop 14 is directly coupled with one of the input terminals of an AND circuit 16. The output of the flip-flop 15 is coupled with the other input terminal of the AND circuit 16, via an inverter 17. The flip-flops 14 and 15, And circuit 16, and inverter 17 are combined to form a called one-shot circuit which, upon receipt of a signal from the OR gate 13, produces one timing signal WP1 with the time width corresponding to one word time irrespective of the time width of the signal inputted. The timing signal WP1 is outputted from the AND circuit 16. The output signal WP1 is directly applied to a decoder 18 and to a one-word time delay circuit 19 where it is delayed by one word time and outputted as a timing signal WP2. The decoder 12 is controlled in the outputting by signals from a decoder 20. The decoder 18 is controlled in the outputting by output signals from the decoders 12 and 20. Digit signals D1 to D5 are applied to the input terminals of the decoder 20. When receiving the digit signal D5, the decoder 20 produces a logical "1" signal on the output line 01. When receiving the digit signal D4, it produces the logical "1" on the output lines 02 and 03. When receiving the digit signal D3, it produces the same on the output lines 04 and 05. When receiving the digit signal D2, it produces the same signal on the output lines 06 and 07. When receiving the digit signal D1, it produces the same level signal on the output line 08. Upon receipt of the operation signals from the unit indication keys 11a to 11h, the decoder 12 produces the "1" signals onto the output lines 12a to 12h, respectively. That is, the decoder 12 drives the output line 12a for the unit key 11a operation; 12b for 11b, 12c for 11c, 12d for 11d, 12e for 11e, 12f for 11f, 12g for 11g. The output lines 12a and 12b are connected to an OR gate 21a; the output lines 12c and 12d to an OR gate 21b, the output lines 12e and 12f to an OR gate 21c, the output lines 12g and 12h to an OR gate 21d. The output signals from the OR gates 21a to 21d are coupled with delayed flip-flops 22a to 22d operable in synchronism with the timing signal WP2, respectively. The signals set in these flip-flops 22a to 22d are applied to AND gates 23a to 23d, respectively. The digit signals D1 to D4 are applied to the AND gate 23a; the digit signals D1 to D3 to the AND gate 23b, digit signals D1 to D2 to the AND gate 23c, digit signal D1 to the AND gate 23d. The output signals from these AND gates are outputted as a gating signal through an OR circuit 24 to the arithmetic section shown in FIG. 4. The decoder 18, when receiving the timing signal WP1 from the AND circuit 16, produces a "1" signal on the output line 18a at the timing of any one of the digit signals D2 to D5. Any of the digit signals D1 to D4 causes it to produce the "1" onto the output line 18b. In other words, when receiving the timing signal WP1, the decoder 18 responds to the operations of the unit indication keys 11a, 11c, 11e and 11g to produce an output "1" onto the output line 18a at the timings of D5, D3 and D2. In responsive to the operations of the unit keys 11b, 11d, 11f and 11h, it produces an output "1" onto the output line 18b at the timings of D4, D3, D2 and D1. The output signal outputted through the output line 18a of the decoder 18 is applied to the AND circuit 25a, together with a four-bit code signal "0001" representing a decimal "1". The signal outputted through the output line 18b is applied to the AND circuit 25b, together with a four-bit code signal "0101" for a decimal "5". The output signals from the AND gates 25a and 25b are taken through an OR gate 26 and sent as unitary money data A to the arithmetic unit in FIG. 4.

Referring now to FIG. 4, there is shown the arithmetic unit for calculating a change. In the figure, a display register designated by reference 31 also serves as an X register. The unitary money data A and the purchasing amount data are applied to the X register 31, through a gate circuit 32 controlled by the timing signal WP1. The output of the X register 31 is applied to a display section 4 and returned to the input of the X register itself, through gate circuits 34 and 32 controlled by the timing signals WP2. The output signal of the X register 31 is also applied through a gate circuit 35 controlled by the timing signal WP2 to an adder circuit 36 while through a gate 37 under control by the timing signal WP1 to a Y register 38. The data set in the Y register 38 recirculates through the gate 37 and at the same time goes through a gate 39 under control by the gating signal B from the OR gate 24 in FIG. 3 to the adder 36. The adder 36 responds to an add/subtraction signal fed from the control unit to execute addition or subtraction. The result of the calculation in the adder 36 is applied to the X register 31, through the gates 34 and 32. Incidentally, FIG. 4 illustrates only the change calculating section, with omission of a general calculation system.

In operation, an operator properly operates keys on the keyboard 1 for processing the purchasing amount of the customer. The purchasing amount is stored in the X register 31 in FIG. 4 and is displayed at the display section 4. After completion of the purchasing amount processing, when the change for the money received from a customer is calculated, the unit keys 11a to 11h are selectively depressed corresponding to the unitary data of the monetary units of the received money. For example, when the purchasing amount is ¥13,234 and the received money is ¥20,000, the unitary data of the monetary unit of the received money is ¥10,000 and therefore the unit key 11a is pushed. Upon the pushing of the unit key 11a, the OR circuit 13 produces a "1" signal and the flip-flop 14 is set in synchronism with the timing signal We. At this time point, the AND gate 16 produces a "1" signal. At the time point that the succeeding timing signal We sets the flip-flop 15 to a "1" state, the output of the inverter 17 becomes "0" to disable the AND gate 16. As a result, the AND gate 16 produces a timing signal WP1 with the time length of one word time. When the timing signal WP1 is outputted from the AND gate 16, the decoder 18 outputs a "1" signal through the output line 18a at the timing of the digit signal D5 to condition the AND gate 25a. Accordingly, the code signal "0001" for decimal "1" passes through the gate 25a at the application thereto of the digit signal D5 from the gate 26 and through the OR circuit 26 to the gate circuit 32 in FIG. 4. At this time, the gate circuits 32 and 37 have received the timing signal WP1. Therefore, the purchasing amount stored in the X register 31, i.e. ¥13,234, is transferred through the gate circuit 37 to the Y register 38. And the output signal A of the OR circuit 26, i.e. the unitary money data "0001", is set in the X register 31, through the gate 32. In this case, the unitary money data is outputted at the timing of the D5, from the OR circuit 26. Accordingly, a binary digit "1" is set in the 5th digit of the X register 31 and another binary digit "0" is set in the remaining 1st to 4th digits. That is, the X register is set in the form of "10000". The output signal from the unit key 11a also produces a "1" signal onto the output line 12a of the decoder 12. The output signal of the decoder 12 is taken through the OR circuit 21a and is stored into the flip-flop 22a in synchronism with the timing signal WP2. As a result, the output of the flip-flop 22a becomes "1" to enable the AND circuit 23a and the digit signals D1 to D4 pass through the AND gate 23a and the OR gate 24 to the gate circuit 39. The gate 39 continues its enabling during the application thereto of the digit signals D1 to D4 to permit the contents of the 1st to 4th digits, i.e. "3234", of the Y register 38 having the purchasing amount "13234" to be transferred to the adder circuit 36. At this time, the unitary money data "¥10,000" stored in the X register 31 is transferred to the adder circuit 36 through a gate circuit 35 at the timing of the signal WP2. Further, at this time, the control unit issues a subtraction command to the adder 36. Responsive to the subtraction command, the adder 36 executes the subtraction of the contents below the 4th digit "3234", of the purchasing amount from the unitary money data "¥10,000", i.e. 10,000−3,234=6,766. The result of the subtraction is stored into the X register 31, through the gates 34 and 32 and is displayed as the change for the received money ¥ 20,000 by the display section 4.

In this manner, when the unit key 11a, 11c, 11e or 11g is depressed corresponding to the amount of the change, the decoder 18 drives the output line 18a to designate the AND circuit 25a and the AND circuit 25a produces the unitary money data representing "10,000", "1,000", "100" or "10" which in turn is set in the X register 31. When the unit key 11b, 11d, 11f or 11h is depressed, the decoder 18 drives the output line 18b to designate the AND gate 25b which in turn produces the unitary money data representing "5,000", "500", "50" or "5" and the unitary money produced is then stored in the register 31. Upon depression of the unit key 11a or 11b, the decoder 12 designates the AND gate 23a to permit the digit signals D1 to D4 to pass therethrough to the gate 39. As a consequence, the value below the 4th digit of the sales total is read out from the Y register and is fed as a subtraction to the adder 36. Upon depression of the unit key 11c or 11d, the AND gate 23b is designated to read out the value below the 3rd digit by the digit signals D1 to D3. The depression of the unit operation key 11e or 11f designates the AND gate 23c to read out the value below the 2nd digit from the Y register 38. The depression of the unit key 11g or 11h designates the AND gate 23d to read out the 1st digit of the purchasing amount from the Y register 38. These read-out data are transferred as subtraction data to the adder 36 where the change calculation is performed. The result of the subtraction in the adder 36 is displayed as change by the display section 4.

In the case of the U.S. monetary system, bank notes are 100, 50, 20, 10, 5, 2 and 1 dollar and coins are 50, 25, 10, 5 and 1 cent. Accordingly, there are twelve monetary units; 100, 50, 20, 10, 5, 2, 1, 0.5, 0.25, 0.1, 0.05, and 0.01 dollar. Here, the 0.01 dollar is the minimum unitary money so that it is not used in the invention. That is, 11 kinds of unit keys are used. FIG. 5 shows a change calculation table in the U.S. monetary system which corresponds to the table in FIG. 2 for the Japanese monetary system. When the purchasing amount of a customer is "$100.01" and the money received from the customer is $200, the unit key for the $100 monetary unit is depressed so that the cash register performs the subtraction 100−00.01=99.99. When the received money is $150, 50−00.01=49.99. As seen from FIG. 5, the change for other received money is similarly calculated by operating one time the unit key corresponding to the unitary data of the monetary unit of the received money.

Figure 6:
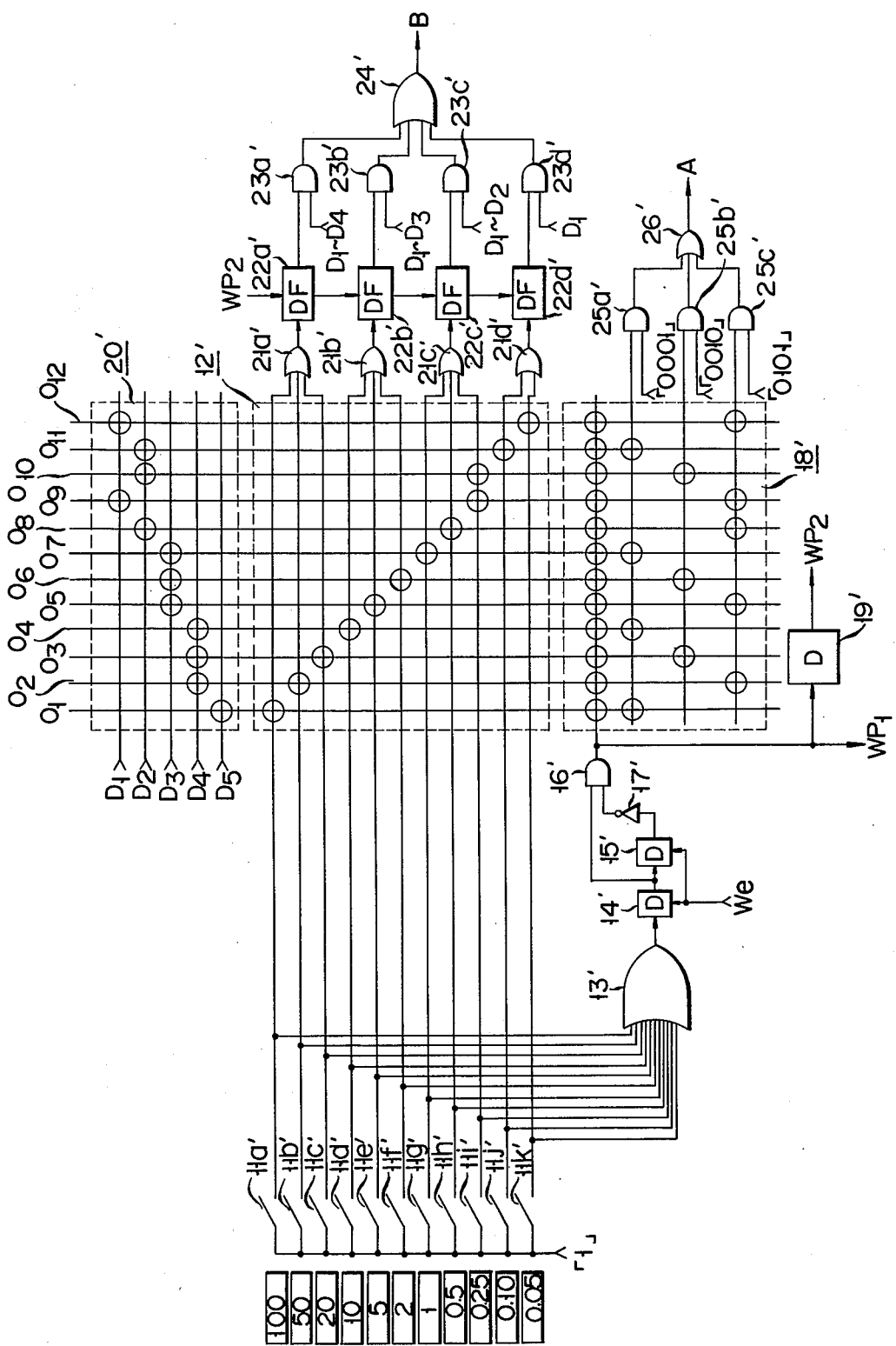
FIG. 6 shows a circuit diagram of an input control unit for change calculation in the monetary system shown in FIG. 5.

As described above, the change calculation in the U.S. monetary system needs 11 unit keys for change calculation. Therefore, the input control unit for this is realized by modifying slightly the FIG. 3 circuit, as shown in FIG. 6. The explanation of it will be omitted since both the circuits are principally the same.

As described above, when the change calculation is performed, the unit key representing the unitary data of the monetary unit of the money received from a customer is merely pushed without inputting the purchasing amount of the received money. Accordingly, the key operation for change calculation is considerably simplified. Further, the change calculation is made for a monetary unit so that the calculation work is simplified and thus rapidly made.

In the above-mentioned embodiment those monetary units not used in a daily life may be considered as being omitted.

What is claimed is:

1. A change calculation apparatus for calculating the difference between a sales total and an amount of money tendered by a purchaser, comprising:
   a multi-digit memory device for storing numeral data corresponding to a sales total amount;
   demonination keys provided for respective classes of money units for use in calculating the difference between said sales total amount and an amount of money tendered by a purchaser;
   outputting means coupled to said denomination keys and responsive to the operation of at least one of the denomination keys to deliver denomination data corresponding to a respective class of money unit;
   readout means responsive to the operation of said at least one denomination key for designating those predetermined ones of a plurality of digits of said memory device and for reading out their contents from said memory device; and
   subtracting means coupled to said readout means and to said outputting means for subtracting from said denomination data delivered from said outputting means only those of the numeral data of said sales total amount stored in said predetermined digits of said memory device which are read out by said readout means, the result of the subtraction operation in said subtracting means corresponding to the calculated amount of change.

2. The change calculation apparatus of claim 1, wherein said denomination keys respectively comprise at least one of the monetary units of 100 dollar, 50 dollar, 20 dollar, 10 dollar, 5 dollar, one dollar, 50 cent, 25 cent, 10 cent, and 5 cent.

3. The change calculation apparatus of either of claims 1 or 2 wherein said outputting means is responsive to the operation of only a single one of said denomination keys.

* * * * *